US008881136B2

(12) United States Patent
DeJana et al.

(10) Patent No.: US 8,881,136 B2
(45) Date of Patent: Nov. 4, 2014

(54) IDENTIFYING OPTIMAL UPGRADE SCENARIOS IN A NETWORKED COMPUTING ENVIRONMENT

(75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/418,664

(22) Filed: Mar. 13, 2012

(65) Prior Publication Data

US 2013/0247022 A1  Sep. 19, 2013

(51) Int. Cl.
*G06F 9/445* (2006.01)

(52) U.S. Cl.
USPC ........... 717/174; 717/176; 717/177; 717/178; 709/201; 709/203; 709/238

(58) Field of Classification Search
CPC ..................................... G06F 8/60; G06F 8/61
See application file for complete search history.

(56) References Cited

U.S. PATENT DOCUMENTS

| 6,493,871 | B1* | 12/2002 | McGuire et al. ............... 717/173 |
| 7,117,355 | B2 | 10/2006 | Zomaya et al. |
| 7,577,948 | B2 | 8/2009 | Zomaya et al. |
| 7,702,497 | B2 | 4/2010 | Dombrowski et al. |
| 8,266,615 | B2* | 9/2012 | Shapiro .......................... 717/175 |
| 8,745,267 | B2* | 6/2014 | Luecke et al. ................. 709/241 |
| 2003/0051236 | A1* | 3/2003 | Pace et al. ..................... 717/177 |
| 2003/0137536 | A1* | 7/2003 | Hugh ............................. 345/744 |
| 2004/0268109 | A1* | 12/2004 | Rothman et al. ................... 713/1 |
| 2005/0036348 | A1* | 2/2005 | Aoyama ........................... 365/49 |
| 2005/0066019 | A1 | 3/2005 | Egan et al. |
| 2006/0109785 | A1* | 5/2006 | Chandwadkar et al. ...... 370/229 |
| 2008/0141242 | A1* | 6/2008 | Shapiro .......................... 717/174 |
| 2009/0089775 | A1 | 4/2009 | Zusman |
| 2009/0125904 | A1* | 5/2009 | Nelson ............................. 718/1 |
| 2009/0300423 | A1 | 12/2009 | Ferris |
| 2010/0049756 | A1 | 2/2010 | Chemitiganti et al. |
| 2010/0162226 | A1 | 6/2010 | Borissov et al. |
| 2010/0169537 | A1* | 7/2010 | Nelson ............................. 711/6 |
| 2010/0257518 | A1 | 10/2010 | Baratti et al. |
| 2010/0269167 | A1* | 10/2010 | Kashima ........................... 726/7 |
| 2010/0306169 | A1* | 12/2010 | Pishevar et al. ............... 707/613 |

(Continued)

OTHER PUBLICATIONS

Maitland, J., "Keeping Control Isn't Easy", Chapter 4: Cloud-Based Infrastructure, SearchCloudComputing.com, 13 pages.

(Continued)

*Primary Examiner* — Chameli Das
(74) *Attorney, Agent, or Firm* — William E. Schlesser; Keohane & D'Alessandro, PLLC

(57) ABSTRACT

Embodiments of the present invention provide an approach to mitigate the risk of downtime or failed upgrades to a networked computing environment (e.g., a cloud computing infrastructure). This approach generally comprises pre-testing and evaluating potential upgrade paths to identify potential problems, and optionally recommending one or more optimal configurations. Specifically, if a proposed upgrade is identified as having potential points of failure (e.g., based on pre-testing), an end user/customer may be so notified. If the upgrade has several potential successful configurations, such configurations may be evaluated to identify a configuration that appears to have the greatest likelihood of a successful installation scenario. Optionally, the end user may then choose to redirect workload(s) to a successfully configured system that has been provisioned and pre-tested.

22 Claims, 12 Drawing Sheets

(56) References Cited

U.S. PATENT DOCUMENTS

| | | |
|---|---|---|
| 2011/0075674 A1* | 3/2011 | Li et al. .................. 370/401 |
| 2011/0137949 A1* | 6/2011 | Bobick et al. ............. 707/793 |
| 2011/0138047 A1 | 6/2011 | Brown et al. |
| 2011/0264787 A1 | 10/2011 | Mickens et al. |
| 2011/0265077 A1 | 10/2011 | Collison et al. |
| 2011/0271270 A1 | 11/2011 | Bowen |

OTHER PUBLICATIONS

Mell et al., "The NIST Definition of Cloud Computing", National Institute of Standards and Technology, Information Technology Laboratory, Version 15, Oct. 7, 2009, 2 pages.

Langton, D., "10 good reasons to go to the cloud", May 12, 2011, 3 pages. http://blogs.technet.com.

* cited by examiner

IDENTIFYING OPTIMAL UPGRADE SCENARIOS IN A NETWORKED COMPUTING ENVIRONMENT

TECHNICAL FIELD

In general, embodiments of the present invention relate to application installation upgrades. Specifically, embodiments of the present invention relate to the evaluation of upgrade scenarios in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Virtual server operating systems and applications may be rapidly provisioned and de-provisioned in a cloud computing environment. However, once a configured server either in a traditional data center or as a virtual machine becomes available to a cloud consumer, the steps are substantially similar whether one is upgrading an operating system, middleware, and/or an application. Thus, the time needed to carry out these upgrade tasks is comparable, regardless of whether the system is a physical server or a virtual server. Moreover, downtime and application unavailability caused by an outage, cancelled update, or prolonged update may potentially pose a risk to system availability and/or meeting service level agreement objectives. As such, challenges may exist in upgrading such systems.

SUMMARY

Embodiments of the present invention provide an approach to mitigate the risk of downtime or failed upgrades to a networked computing environment (e.g., a cloud computing infrastructure). This approach generally comprises pre-testing and evaluating potential upgrade paths to identify potential problems, and optionally recommending one or more optimal configurations. Specifically, if a proposed upgrade is identified as having potential points of failure (e.g., based on pre-testing), an end user/customer may be so notified. If the upgrade has several potential successful configurations, such configurations may be evaluated to identify a configuration that appears to have the greatest likelihood of a successful installation scenario. Optionally, the end user may then choose to redirect workload(s) to a successfully configured system that has been provisioned and pre-tested.

A first aspect of the present invention provides a computer-implemented method for evaluating upgrade scenarios in a networked computing environment, comprising: receiving a selection of an application to be deployed in the networked computing environment; receiving an identification of a planned destination in the networked computing environment for the application, and associated installation criteria; provisioning and configuring the planned destination according to the installation criteria; attempting to install the application in the planned destination; determining whether the application installed successfully in the planned destination; identifying, responsive to the application being unsuccessfully installed, a set of potential scenarios for successfully installing the application; and evaluating each of the set of potential scenarios to identify AN optimal scenario for installing the application; and implementing the optimal scenario.

A second aspect of the present invention provides a system for evaluating upgrade scenarios in a networked computing environment, comprising: a bus; a processor coupled to the bus; and a memory medium coupled to the bus, the memory medium comprising instructions to: receive a selection of an application to be deployed in the networked computing environment; receive an identification of a planned destination in the networked computing environment for the application, and associated the installation criteria; provision and configure the planned destination according to installation criteria; attempt to install the application in the planned destination; determine whether the application installed successfully in the planned destination; identify, responsive to the application being unsuccessfully installed, a set of potential scenarios for successfully installing the application; evaluate each of the set of potential scenarios to identify AN optimal scenario for installing the application; and implement the optimal scenario.

A third aspect of the present invention provides a computer program product for evaluating upgrade scenarios in a networked computing environment, the computer program product comprising a computer readable storage media, and program instructions stored on the computer readable storage media, to: receive a selection of an application to be deployed in the networked computing environment; receive an identification of a planned destination in the networked computing environment for the application, and associated installation criteria; provision and configure the planned destination according to the installation criteria; attempt to install the application in the planned destination; determine whether the application installed successfully in the planned destination; identify, responsive to the application being unsuccessfully installed, a set of potential scenarios for successfully installing the application; evaluate each of the set of potential scenarios to identify an optimal scenario for installing the application; and implement the optimal scenario.

A fourth aspect of the present invention provides a method for deploying a system for evaluating upgrade scenarios in a networked computing environment, comprising: providing a computer infrastructure to: receive a selection of an application to be deployed in the networked computing environment; receive an identification of a planned destination in the networked computing environment for the application, and associated installation criteria; provision and configure the planned destination according to the installation criteria; attempt to install the application in the planned destination; determine whether the application installed successfully in the planned destination; identify, responsive to the application being unsuccessfully installed, a set of potential scenarios for successfully installing the application; evaluate each of the set of potential scenarios to identify AN optimal scenario for installing the application; and implement the optimal scenario.

BRIEF DESCRIPTION OF THE DRAWINGS

These and other features of this invention will be more readily understood from the following detailed description of the various aspects of the invention taken in conjunction with the accompanying drawings in which.

Figure 1:
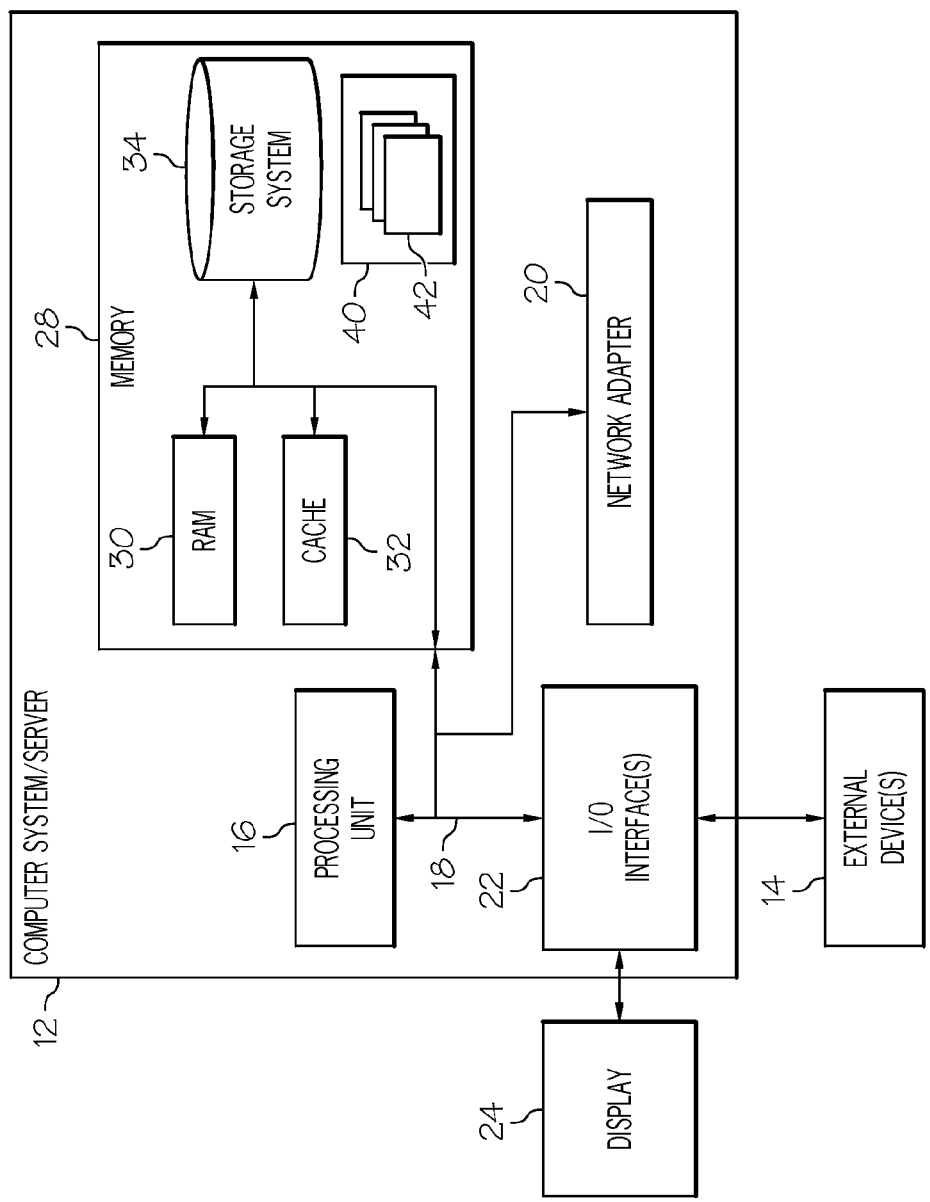
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach to mitigate the risk of downtime or failed upgrades to a networked computing environment (e.g., a cloud computing infrastructure). This approach generally comprises pre-testing and evaluating potential upgrade paths to identify potential problems, and optionally recommending one or more optimal configurations. Specifically, if a proposed upgrade is identified as having potential points of failure (e.g., based on pre-testing), an end user/customer may be so notified. If the upgrade has several potential successful configurations, such configurations may be evaluated to identify a configuration that appears to have the greatest likelihood of a successful installation scenario. Optionally, the end user may then choose to redirect workload(s) to a successfully configured system that has been provisioned and pre-tested.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
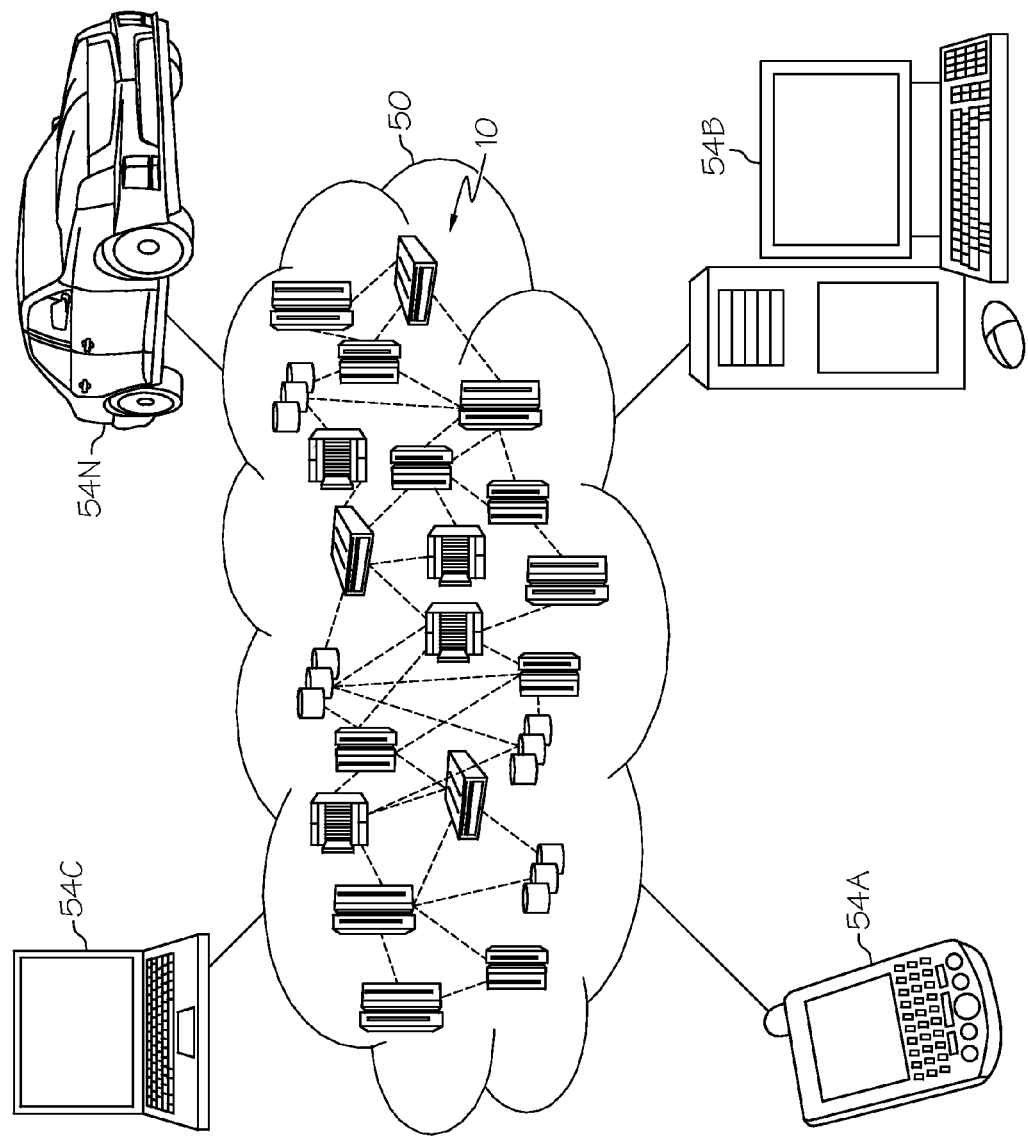
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
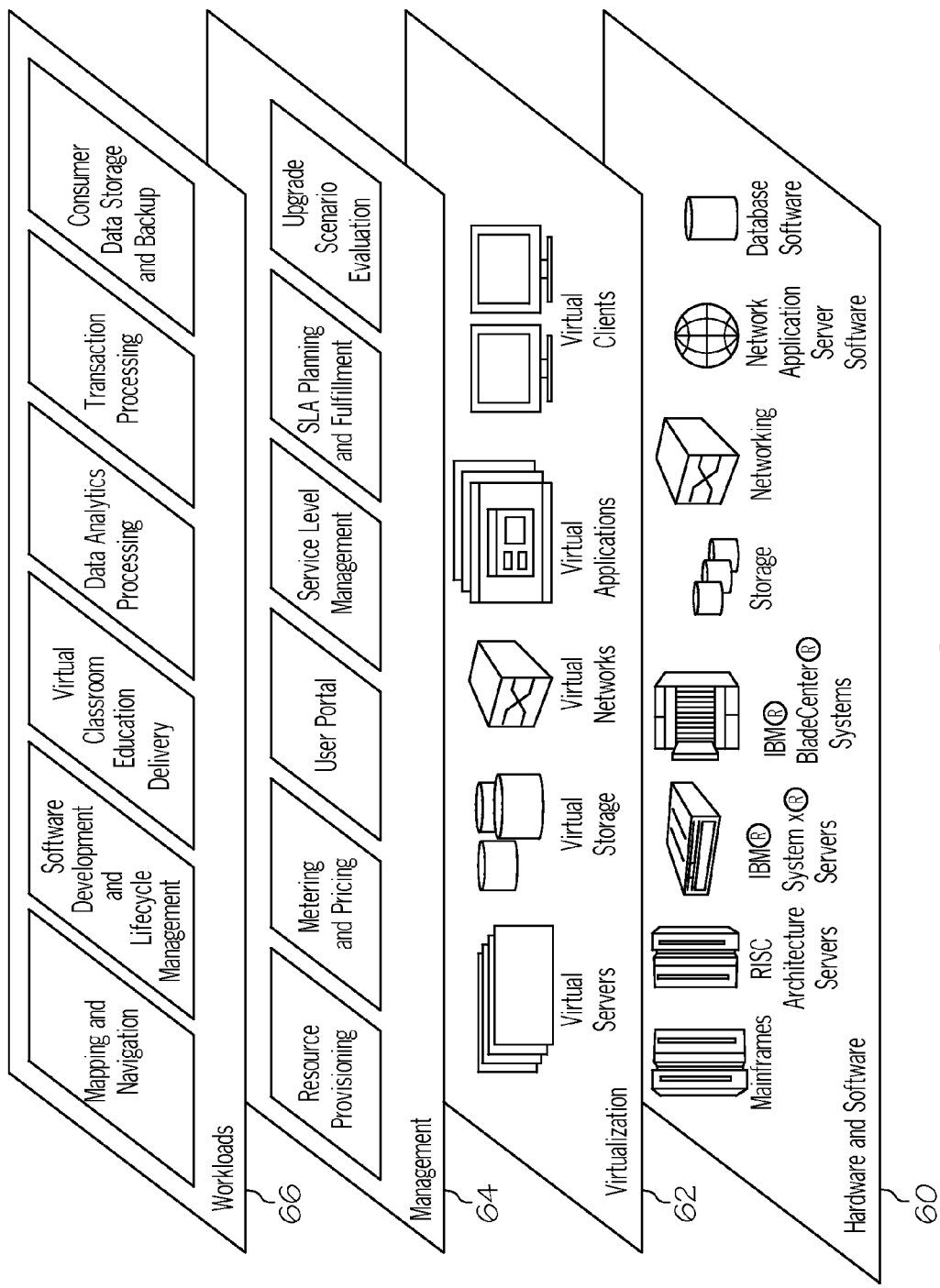
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is upgrade scenario evaluation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the upgrade scenario evaluation functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
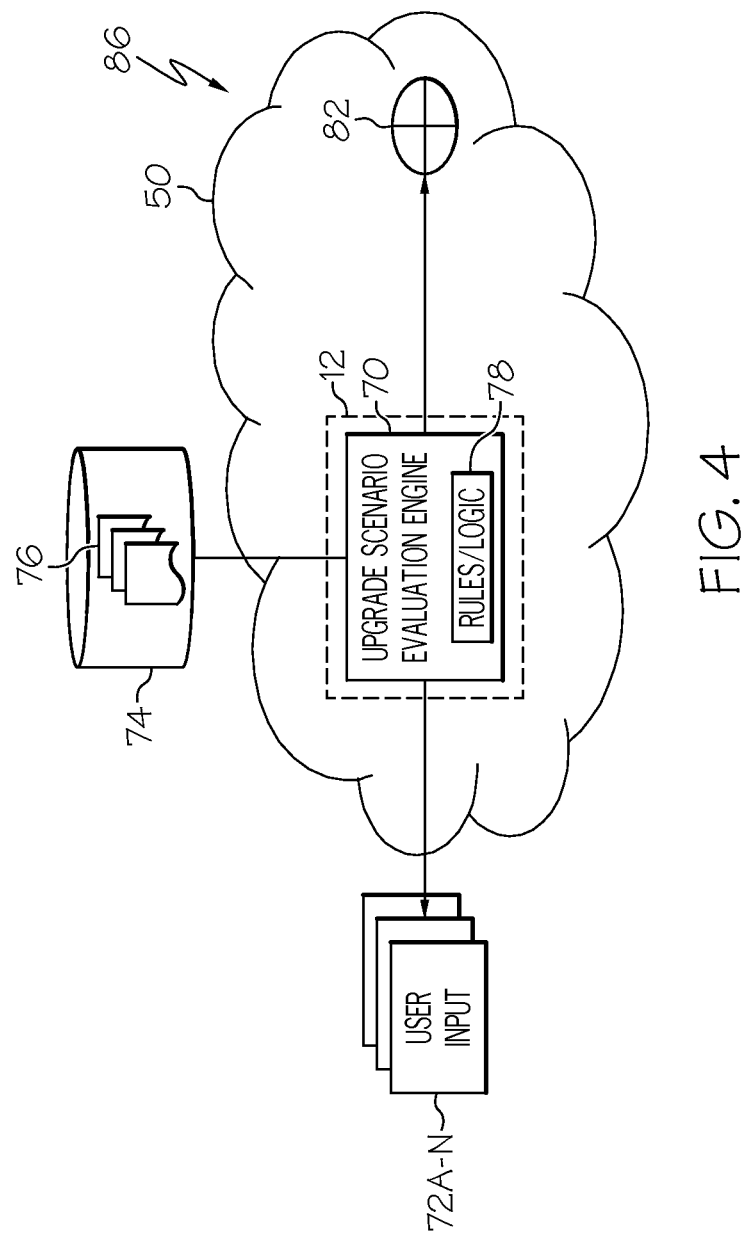
FIG. 4 depicts an illustrative system diagram according to an embodiment of the present invention

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A stand-alone computer system/server 12 is shown in FIG. 4 for illustrative purposes only. In the event the teachings recited herein are practiced in a networked computing environment 86, each client need not have an upgrade scenario evaluation engine (engine 70). Rather, engine 70 could be loaded on a server or server-capable device that communicates (e.g., wirelessly) with the clients to provide upgrade scenario evaluation therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules 78 and/or provides upgrade scenario evaluation hereunder.

Along these lines, engine 70 may perform multiple functions similar to a general-purpose computer. Specifically, among other functions, engine 70 may (among other things): receive a selection of an application to be deployed in the networked computing environment 86; receive an identification of a planned destination 82 (e.g., a virtual machine infrastructure/topology, an operating system, middleware, etc.) in the networked computing environment 86 for the application and associated installation criteria (the selection/designation of the application, proposed destination, installation criteria, and/or a testing suite for testing the application as installed is collectively shown as input 72A-N in FIG. 4); provision and configure the planned destination 82 according to installation criteria; attempt to install the application in the planned destination 82; determine whether the application installed successfully in the planned destination 82 (e.g., using the provided/designated testing suite); identify, responsive to the application being unsuccessfully installed, a set of potential scenarios 76 (e.g., based on historical data stored in one or more computer storage devices 74) for successfully installing the application; evaluate each of the set of potential scenarios 76 to identify the optimal scenario for installing the application; implement the optimal scenario; and/or generate a report identifying the set of potential scenarios.

It is understood that in performing these functions, engine 70 is further configured to identify at least one component of the planned destination 86 and/or application that failed during the installation. Moreover, each of the set of potential scenarios 76 may comprise a modification of the planned destination 86 based on the at least one component that failed.

Process Flow

Shown below are process flows according to at least one embodiment of the present invention.

1. An end user develops and packages an application, such as an enterprise Java® (Java and related terms are trademarks of Sun Microsystems in the United States and/or other countries) application in enterprise archive (EAR) format.
    A. Or, the end user or other "deployer" uses an existing and previously hosted application without new code changes.
2. The end user optionally provides a unit test suite or other tests to run to determine whether the application is operating correctly when installed.
3. The end user specifies the planned destination virtual machine cloud infrastructure for the application by selecting, for example, a topology of WebSphere®, DB2®, and Red Hat Linux® (WebSphere, DB2, and related terms are trademarks of International Business machines Corp. in the Unites States and/or other countries. Red Hat, Linux and related terms are trademarks of Red Hat, Inc. in the United States and/or other countries).
    A. This can be done either via some user interface (UI) mechanism, through a configuration file, or other input parameters.
4. The system/engine 70 provisions and configures the WebSphere, DB2 and Linux system according to the end user's selections and installs the provided application artifact(s)/criteria.
5. If the application installs successfully (e.g., installs cleanly with no system error messages, and optionally passes the test suite provided by the end user), the end user is notified of success.
6. If the application fails to install successfully (e.g., fails to install cleanly with system error messages, or fails the test suite provided by the end user), the end user is notified of failure.
7. Whether the application installs successfully or fails to install, the system can then propose several other upgrade scenarios based on which component(s) failed.
    A. For example,
        1. The system may try a different version of WebSphere (or another app server)
        2. The system may try a different version of DB2 (or another data server)
        3. The system may try a different version of Linux (or another operating system)
8. The end user can choose to influence what other scenarios should run, such as to limit the testing to a test on Oracle in addition to DB2, or any app server that supports, for example, Java. Otherwise, the system automatically executes the upgrade scenarios, mixing and matching software components.
9. Based on the results of the upgrade or change scenarios, the system may provide a report of what upgrades will work, or work best to achieve non-functional goals.
    A. Additional details about the changes after upgrade can be included in the report such as:
        1. cost;
        2. middleware;
        3. security;
        4. network;
        5. performance;
        6. etc.
10. Optionally, the system may try to modify properties and settings of the middleware, such as to set WebSphere's Java Virtual Machine (JVM) heap or to turn on DB2's self-tuning memory manager (STMM).
11. Optionally, the system can automatically provision and deploy the application on the optimal system, based on the end user's preferences.

The following process flow more specifically describes some of the steps above according to at least one embodiment of the present invention.

1. The system accepts from the end user:
    A. an application package;
    B. a set of requested hosting middleware and initial configuration information; and
    C. optionally, a test suite that verifies that the configured system meets functional and non-functional requirements, beyond "will it install and start".
2. The system prepares to install the application by provisioning a system with the specified/suggested by the end user above.
    A. For each component (e.g., Linux, WebSphere, DB2) provision a virtual server.
    B. Configure each component (e.g., establish the connection from WebSphere to DB2).
3. The system installs the application package.
    A. Deploy the application to the system.
    B. Attempt to start up the application and records errors and warnings.
    C. If the application starts, move on to the next step, otherwise inform the end user that installation failed.
4. The system runs user supplied functional and non-functional tests.
    A. Using the test suite provided by the end user, the system executes the functional and non-functional tests.

B. The system records not only pass/fail information, but other metrics such as execution time.
C. If the application passes all tests, move on to the next step. Otherwise, inform the end user that functional verification failed.

5. With a baseline system, the system now proactively determines if it will run better on a modified system.
   A. The system now uses the baseline information the system gathered to improve metrics, such as execution time, to find a more optimized configuration.
   B. The system examines possible alternative configurations that might provide performance improvements or cost savings. For example, the system may:
      1. consult a list of available software versions (i.e, every available version of WebSphere and fix packs on numerous operating systems).
      2. Consult a list of best practices, or configuration flags.
   C. For every permutation of alternative configuration, the system repeats steps 2, 3, and 4 above, recording again the information received.
   D. The system may determine the optimal software configuration (levels and settings) that yield the least amount of warnings and best metrics.

ILLUSTRATIVE EXAMPLES

FIGS. 5-10 depict examples showing how the system may use various subsystems to carry out the teachings recited herein. It is understood that each such subsystem may be a subsystem of program 40 of FIG. 1 and/or engine 70 of FIG. 4.

In a first example, assume that an application developer wants to know whether his newly updated application will run on the existing WebSphere 7 and DB2 9.7 infrastructure the developer already has in production. Further assume that the developer wants the system to install and verify the new application on the existing middleware to see if the upgrade will work as intended. If the upgrade succeeds, the developer can choose to apply the upgrade as a new system. If the upgrade fails, the developer may make any changes to the application and try again. In this case, the end user and system operations team may benefit by avoiding a change window (which in the best case will require all parties to be available off hours and take time to execute the upgrade during an outage, and in the worst case, also require a rollback and a second date to be scheduled to try again).

Figure 5:
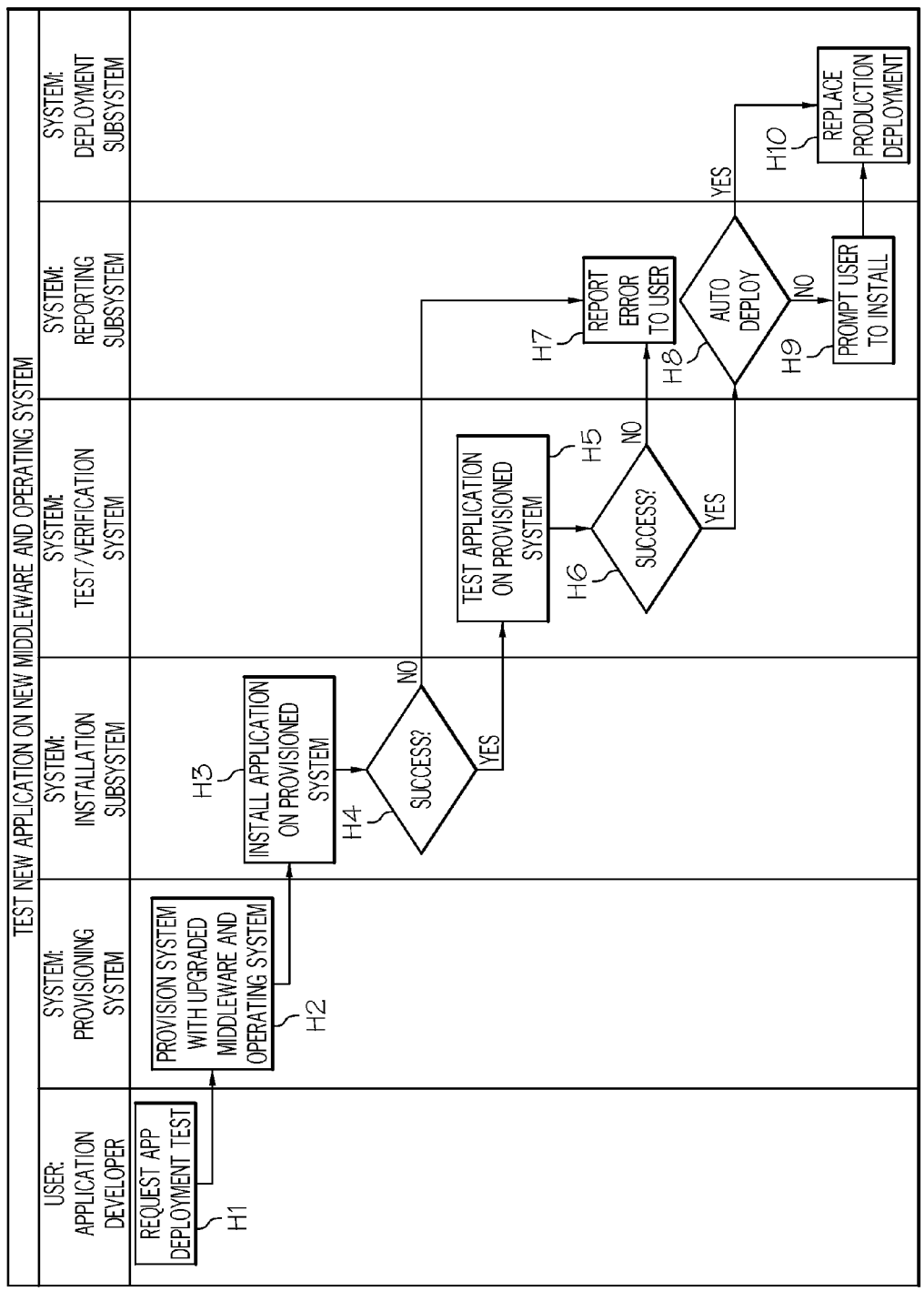
FIG. 5 depicts an illustrative use case according to an embodiment of the present invention.

An illustrative flow diagram of this scenario is shown in FIG. 5. As depicted, in step H1, an application deployment is requested. In step H2, the system is provisioned with upgraded middleware and an operating system. In step H3, the application is installed on the provisioned system. In step H4, it is determined whether the application installed successfully. If not, an error can be reported to the user in step H7. If so, the test application may be provisioned on the system in step H5, and in step H6 it may determined whether the application was automatically deployed in step H8. If so, the production deployment may be replaced in step H10. If not, the user may be prompted to install the application in step H9 before the production deployment is replaced in step H10.

In another example, assume that an end user wants to know whether an existing application will run on a latest WebSphere fix pack. Further assume that the end user wants to test out an upgraded middleware to see if the end user will be able to take advantage of new functionality or security available in the new middleware, while eliminating the risk that the end user's application will be incompatible with the new software. If the upgrade succeeds, the end user may choose to apply the upgrade as a new system or make any changes to the application and try again. In this case, the end user may eliminate the risk of applying a new infrastructure upgrade that may not be compatible with the end user's existing code.

Figure 6:
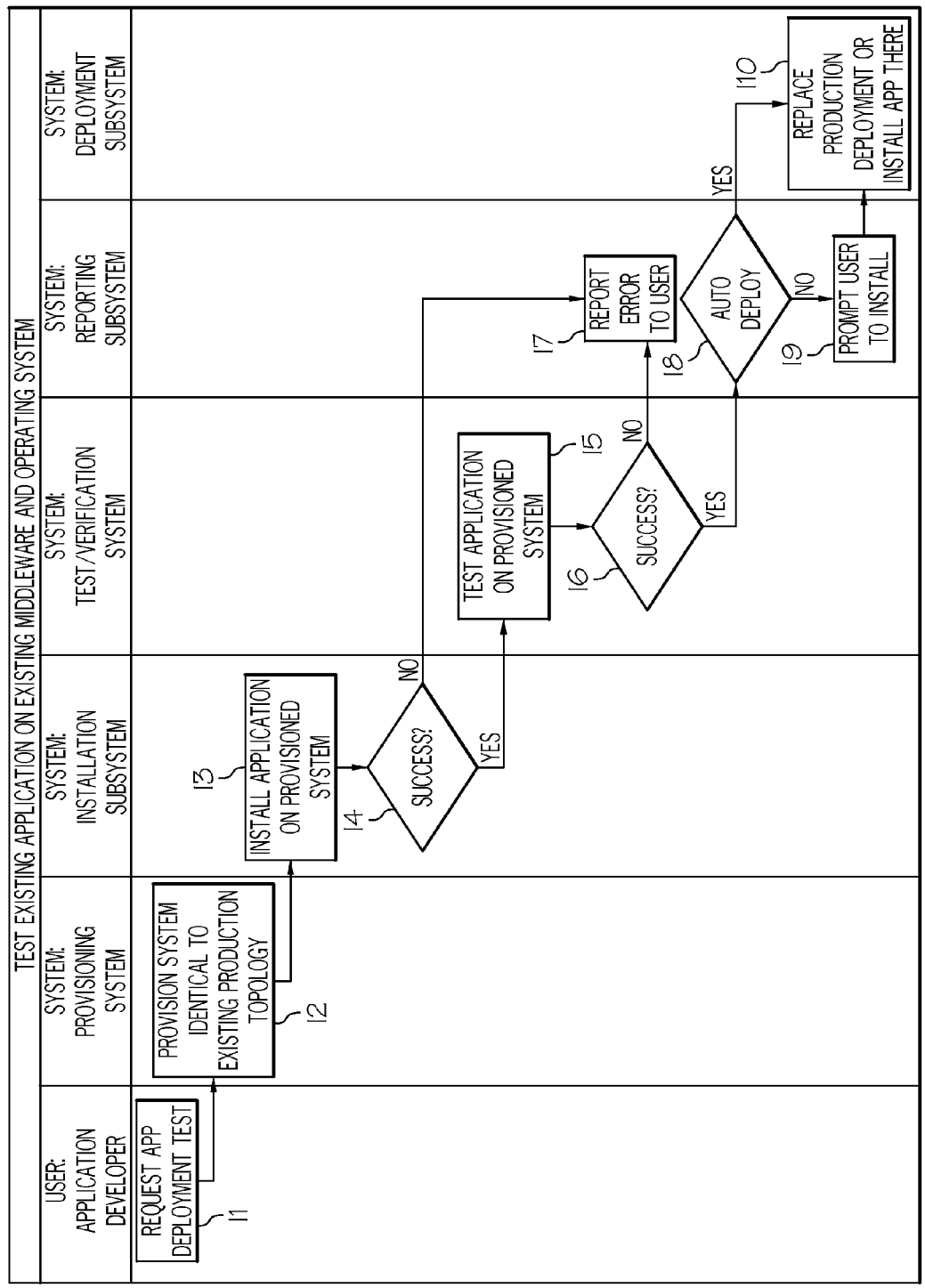
FIG. 6 depicts another illustrative use case according to an embodiment of the present invention.

An illustrative flow diagram of this scenario is shown in FIG. 6. As depicted, in step I1, application deployment is requested. In step I2, the system is provisioned identical or similar to existing production topology. In step I3, the application is installed on the provisioned system. In step I4, it is determined whether the application installed successfully. If not, an error can be reported to the user in step I7. If so, the test application may be provisioned on the system in step I5, and in step I6 it may be determined whether the application was automatically deployed in step I8. If so, the production deployment may be replaced in step I10. If not, the user may be prompted to install the application in step I9 before the production deployment is replaced in step I10.

Assume in another example that an end user wants to know whether the end user's application will run successfully on a different topology. Assume that the end user has developed the application on WebSphere and DB2 on AIX® (AIX is a trademark of International Business Machines Corp. in the United States and/or other countries), and would like to know whether it is also compatible with Linux, so that the end user may expand the market for the application. In this case, a developer may increase a pool of potential customers and provide recommendations to his customer about the deployment environment that is the best fit for his software.

Figure 7:
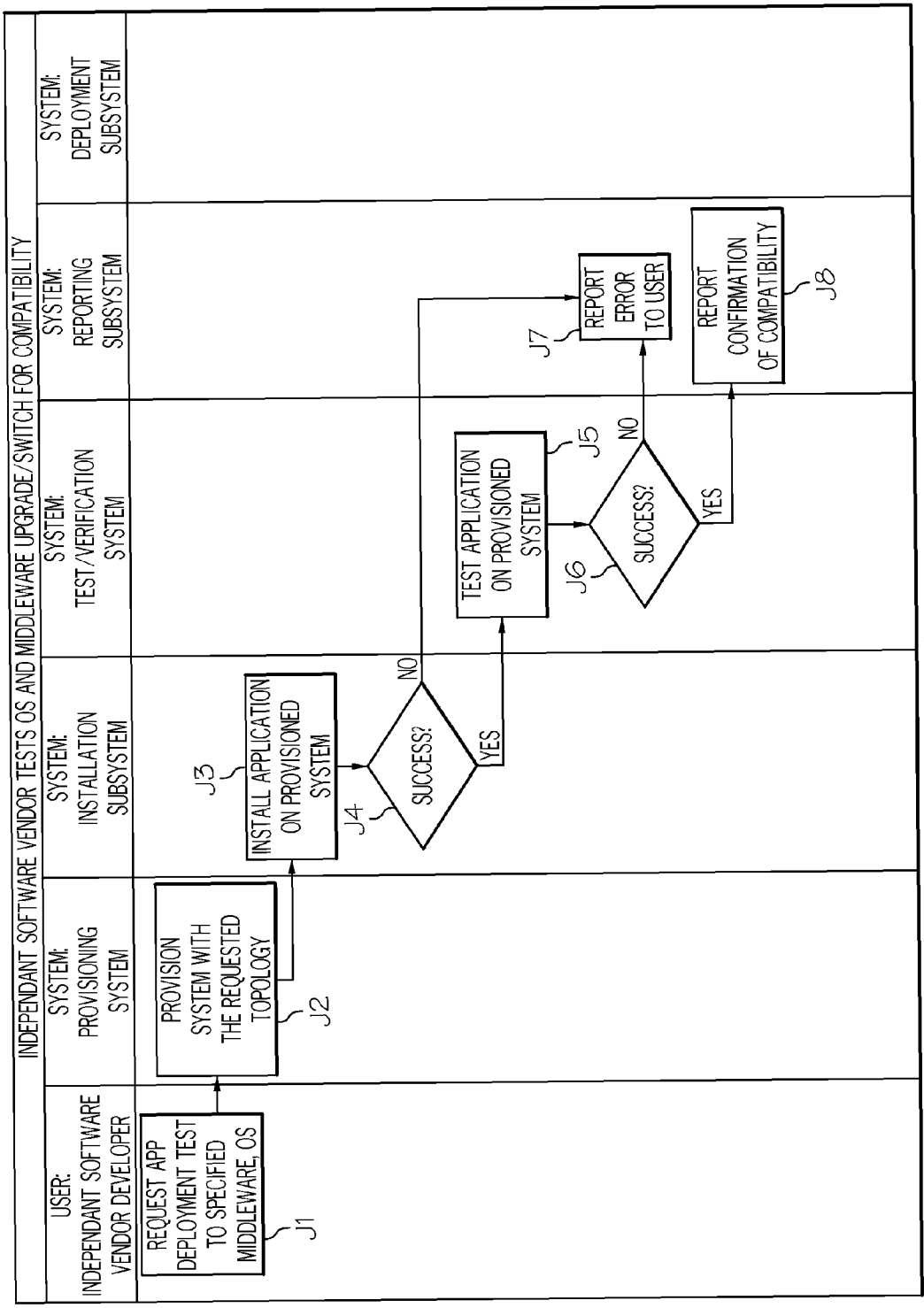
FIG. 7 depicts another illustrative use case according to an embodiment of the present invention.

An illustrative flow diagram of this scenario is shown in FIG. 7. As depicted, in step J1, an application deployment test to specified middleware and operating system is requested. In step J2, the system is provisioned with the requested topology. In step J3, the application is installed on the provisioned system. In step J4, it is determined whether the application installed successfully. If not, an error can be reported to the user in step J7. If so, the test application may be provisioned on the system in step J5, and in step J6, it may be determined whether the test application was deployed successfully. If not, an error may be reported in step J7. If so, a report confirming compatibility of the application may be generated in step J8.

In another example, assume that an end user is trying to improve the performance of an application. Further assume that the end user does not know where the bottleneck in the current infrastructure is. Accordingly, the end user would like to try out several combinations of WebSphere version, WebSphere configurations, DB2 versions, DB2 configurations, and Linux versions and configurations. The end user would also like to know what configuration works best, and, in the process, see any clues as to whether there are bottlenecks the end user can address in the application, such as memory leaks. In this case, the end user saves time and money by not having to install and/or test, a large variety of potential solutions to the end user's problem. The system can do this for the end user automatically, and provide the end user valuable insight into the quality of the application.

Figure 8:
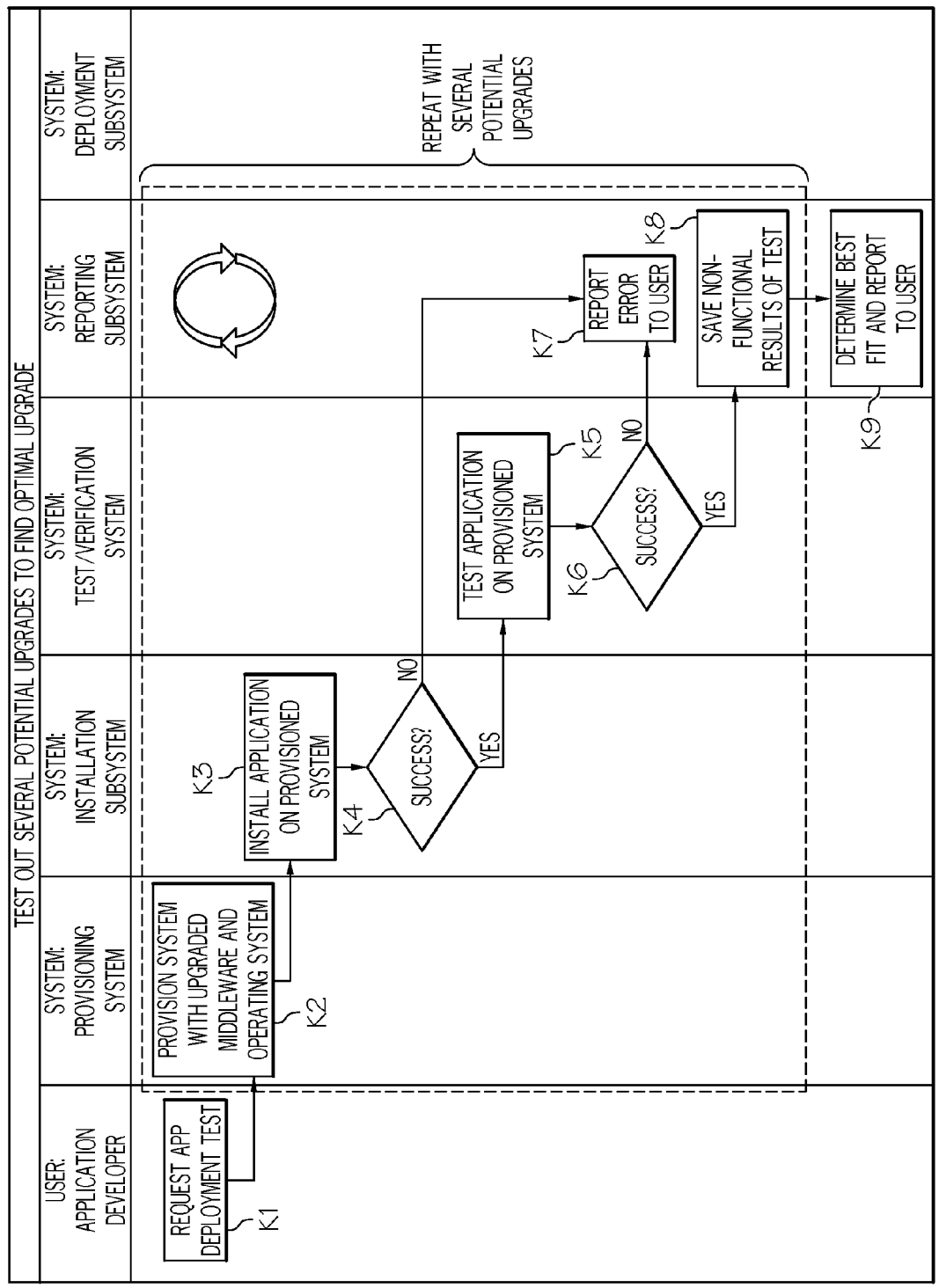
FIG. 8 depicts another illustrative use case according to an embodiment of the present invention.

An illustrative flow diagram of this scenario is shown in FIG. 8. As depicted, in step K1, application deployment testing is requested. In step K2, the system is provisioned with upgraded middleware and an operating system. In step K3, the application is installed on the provisioned system. In step K4, it may be determined whether the application installed successfully. If not, an error can be reported to the user in step K7. If so, the application may be tested on the provisioned system in step K5. Then in step K6, it may be determined whether the application test was successful. If not, an error may be reported in step K7. If so, non-functional test results may be saved in step K8 before a best match/fit is determined and reported to the user in step K9.

Assume in another example that an end user develops a Java application. Further assume that the end user knows that "fix-packs" and security bulletins need to be applied to bring software modules fully up to date, but this process is lengthy and not in the end user's area of expertise. Furthermore, such operations carry the risk of a failed upgrade, downtime, or risk if an upgrade is not made at all. The system may preemptively install and test the application each (e.g., Sunday) morning on the upgraded fix-packs. If the upgrade succeeds, the application migrates to the upgraded system. Otherwise, the end user is notified to take action, whether to skip this upgrade altogether, or make any necessary changes at the code level, within his expertise domain.

Figure 9:
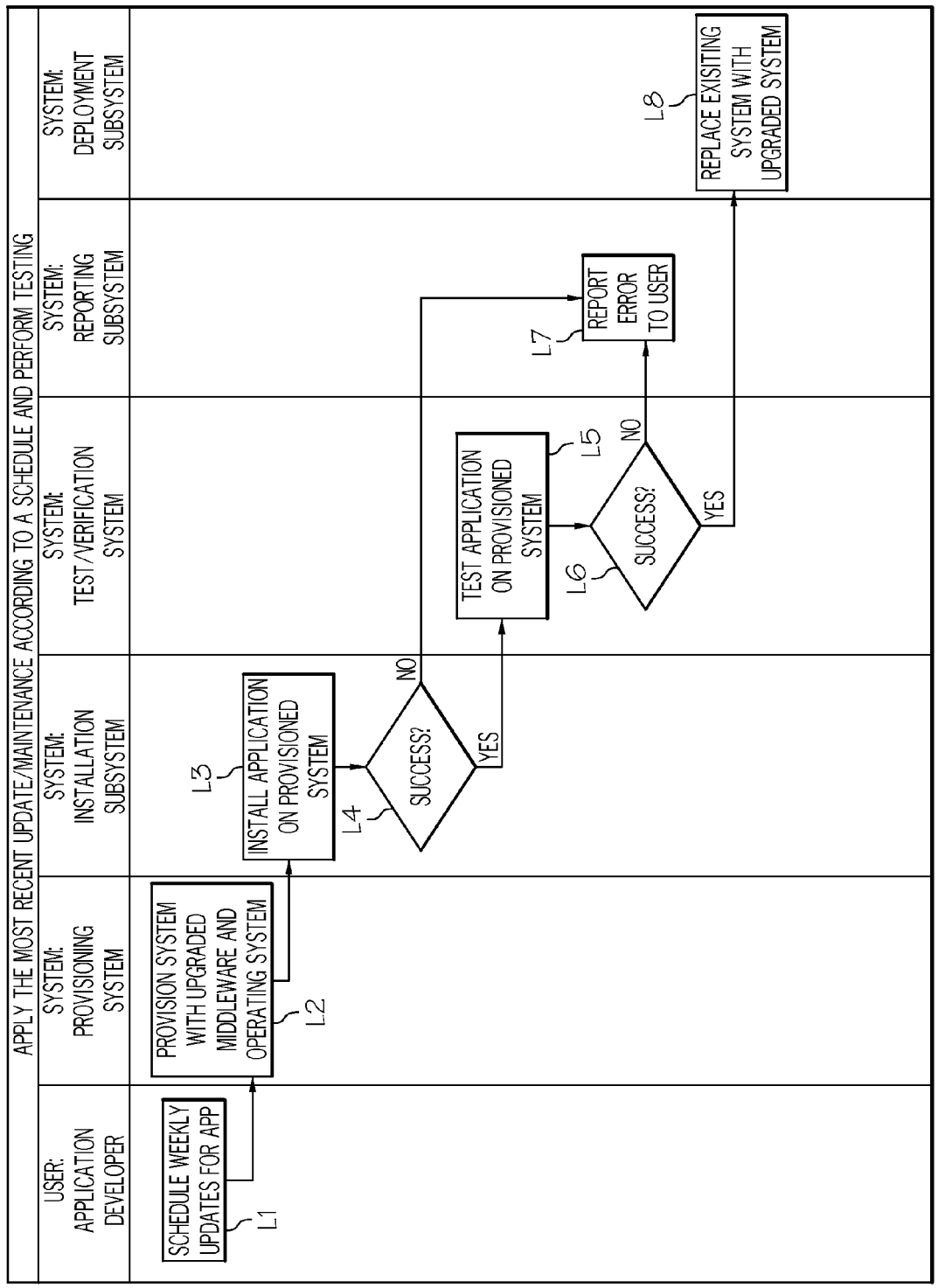
FIG. 9 depicts another illustrative use case according to an embodiment of the present invention.

An illustrative flow diagram of this scenario is shown in FIG. 9. As depicted, in step L1, weekly updates for an application are scheduled. In step L2, the system is provisioned with upgraded middleware and an operating system. In step L3, the application is installed on the provisioned system. In step L4, it is determined whether the application installed successfully. If not, an error can be reported to the user in step L6. If so, the application may be tested on the provisioned system in step L4, and in step L6, it is determined whether the application tested successfully. If not, an error may be reported to the user in step L6. If so, the existing system may be replaced with the upgraded system in step L7.

Assume in another example that a sales representative is trying to make the case to a customer that a particular application will run better on a particular brand of system. Further assume that the sales representative takes the application from the customer and runs it through the system to show side by side whether an upgrade to some or all of the particular system's software will help, or otherwise optimize the application for the customer. This case helps the sales representative sell more software and benefits the customer by seeing whether his choice to go with the particular brand of system shows potential value and reduced risk to execute the change.

Figure 10:
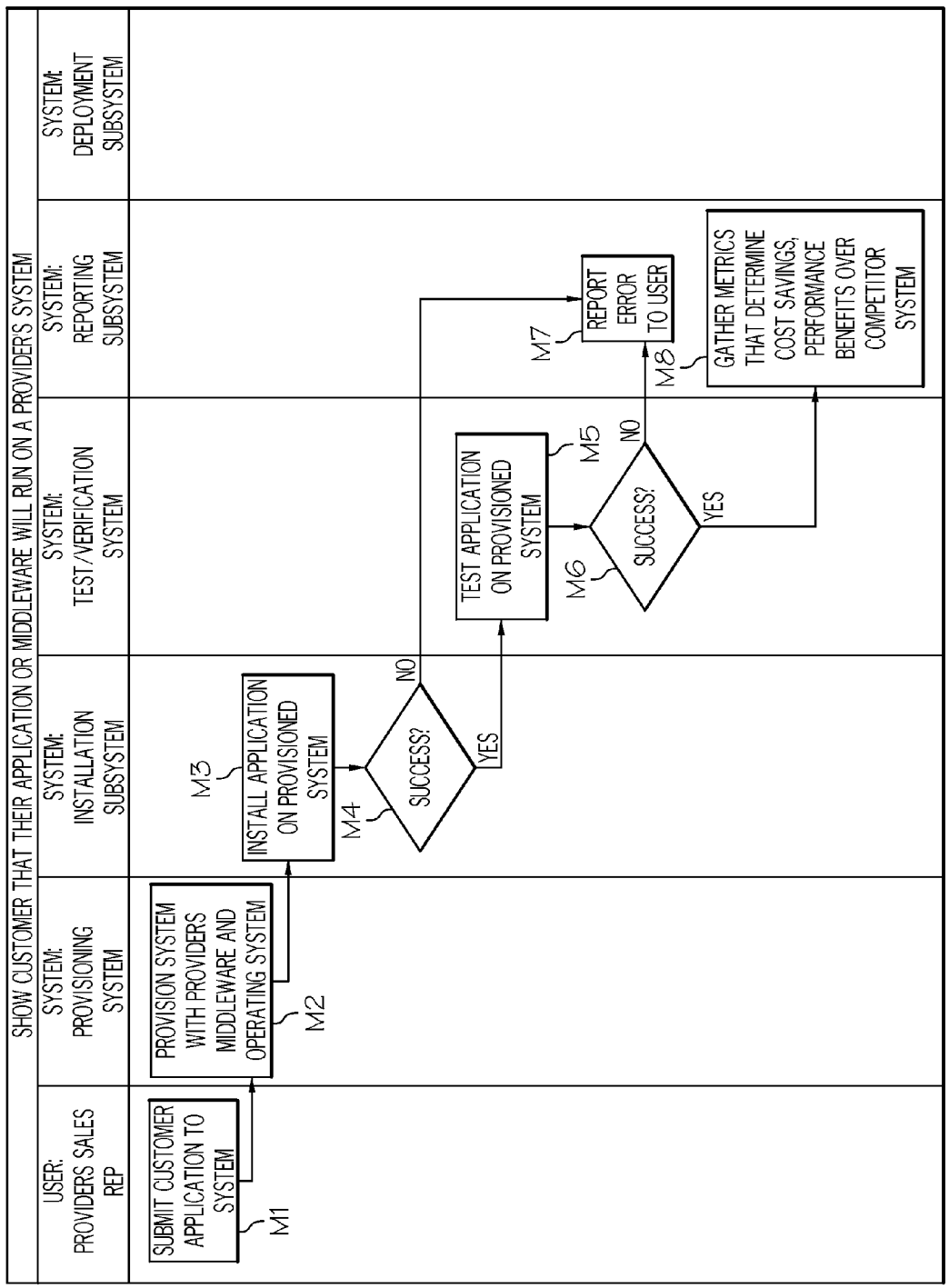
FIG. 10 depicts another illustrative use case according to an embodiment of the present invention.

An illustrative flow diagram of this scenario is shown in FIG. 10. As depicted, in step M1, a customer's application is submitted to the system. In step M2, the system is provisioned with upgraded middleware and an operating system. In step M3, the application is installed on the provisioned system. In step M4, it is determined whether the application installed successfully. If not, an error can be reported to the user in step M7. If so, the application may be tested on the provisioned system in step M5, and in step M6, it is determined whether the application tested successfully. If not, an error may be reported to the user in step M7. If so, metrics that determine cost savings, and performance benefits over competitor systems may be gathered in step M8.

As can be seen, the approach of the present invention provides efficient and elastic server instance provisioning in a networked computing environment to match appropriate middleware hosting environment to a target application automatically. Using this approach, a large number of potential hosting configurations can be tested and verified to locate an optimal configuration of middleware and settings for the application.

Figure 11:
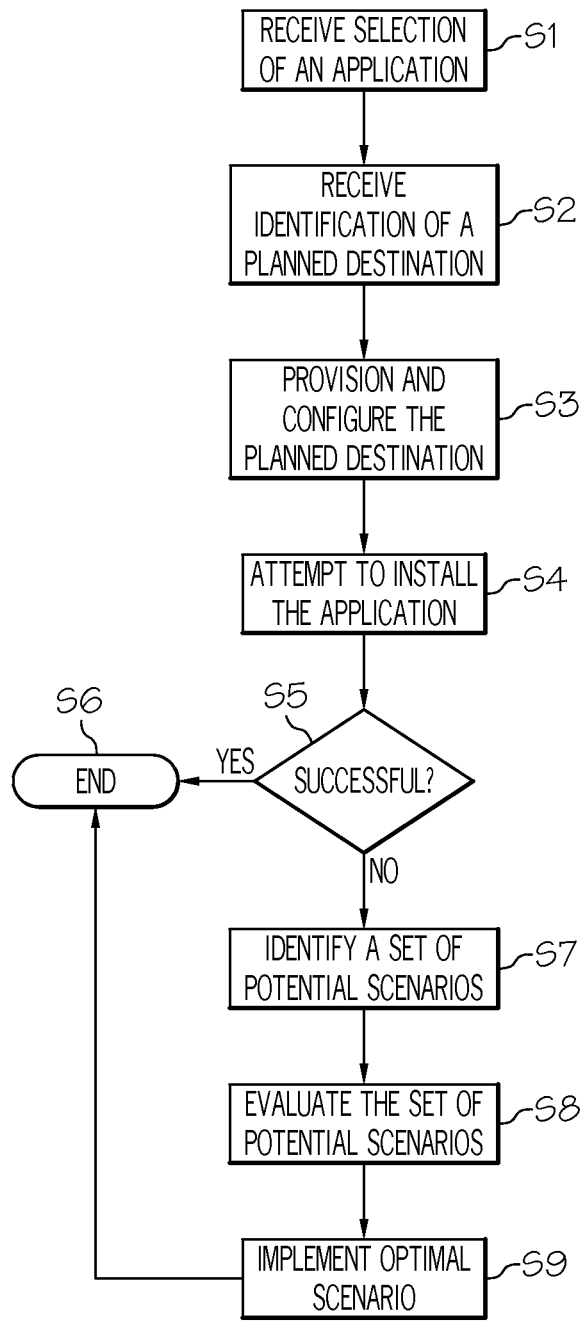
FIG. 11 depicts a method flow diagram according to an embodiment of the present invention.

Referring now to FIG. 11, a method flow diagram according to an embodiment of the present invention is shown. As shown, in step S1, a selection of an application to be deployed in the networked computing environment may be received. In step S2, an identification of a planned destination in the networked computing environment for the application and associated installation criteria may be received. In step S3, the planned destination may be provisioned and configured according to installation criteria. In step S4, an attempt may be made to install the application in the planned destination. In step S5, it may be determined whether the application installed successfully in the planned destination. If so, the process may end in step S6. If not, a set of potential scenarios for successfully installing the application may be identified in step S7. In step S8, each of the set of potential scenarios to identify an optimal scenario for installing the application may be identified. In step S9, the optimal scenario may be implemented before the process is ended in step S6.

Figure 12:
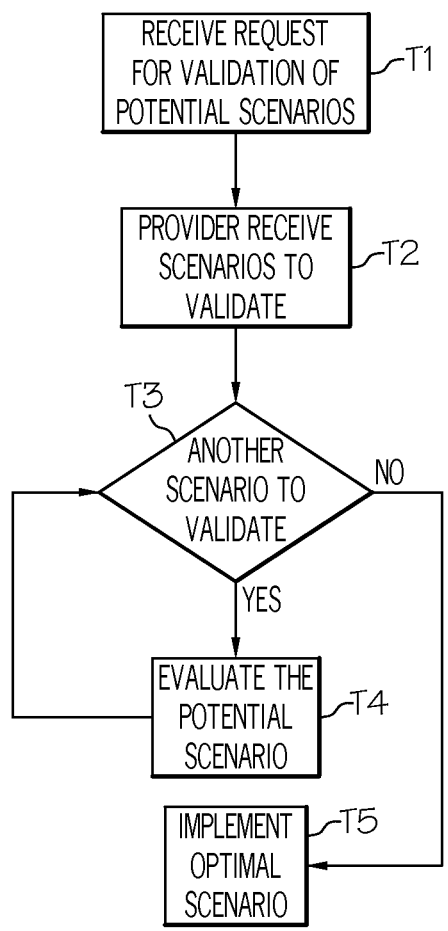
FIG. 12 depicts another method flow diagram according to an embodiment of the present invention.

Referring now to FIG. 12, another method flow diagram according to an embodiment of the present invention is shown. In step T1, a request is received for validation of a set of potential scenarios. In step T2, a set of potential scenarios are identified. In step T3, it is determined whether more potential scenarios need to be validated. If not, the most optimal scenario is implemented in step T5. If more scenarios need to be evaluated, such additional scenarios are evaluated in step T4 before the most optimal scenario is implemented in step T5.

While shown and described herein as an upgrade scenario evaluation solution, it is understood that the invention further provides various alternative embodiments. For example, in one embodiment, the invention provides a computer-readable/useable medium that includes computer program code to enable a computer infrastructure to provide upgrade scenario evaluation functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide upgrade scenario evaluation functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for upgrade scenario evaluation. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for evaluating upgrade scenarios in a networked computing environment, comprising:
   receiving a selection of an application to be deployed in the networked computing environment;
   receiving an identification of a planned destination in the networked computing environment for the application, and associated installation criteria, the planned destination being a virtual server that is distinct from a production deployment;
   provisioning and configuring the planned destination according to the installation criteria;
   attempting to install the application in the planned destination;
   determining whether the application installed successfully in the planned destination;
   identifying, responsive to the application being unsuccessfully installed, a set of potential scenarios for successfully installing the application;
   evaluating each of the set of potential scenarios to identify an optimal scenario for installing the application;
   implementing the optimal scenario; and
   in response to the application being successfully installed according to the optimal scenario, provisioning and deploying the application for use as the production deployment on the optimal system based on preferences of an end user.

2. The computer-implemented method of claim 1, the planned destination and the production deployment each comprising a virtual machine infrastructure.

3. The computer-implemented method of claim 1, further comprising identifying at least one component of the planned destination that failed during the installing.

4. The computer-implemented method of claim 3, each of the set of potential scenarios comprising a modification of the planned destination based on the at least one component.

5. The computer-implemented method of claim 1, further comprising receiving a selection of a test suite for determining whether the application was installed successfully.

6. The computer-implemented method of claim 1, further comprising generating a report identifying the set of potential scenarios.

7. The computer-implemented method of claim 1, the networked computing environment comprising a cloud computing environment.

8. A system for evaluating upgrade scenarios in a networked computing environment, comprising:
   a bus;
   a processor coupled to the bus; and
   a memory medium coupled to the bus, the memory medium comprising instructions to:
      receive a selection of an application to be deployed in the networked computing environment;
      receive an identification of a planned destination in the networked computing environment for the application, and associated installation criteria, the planned destination being a virtual server that is distinct from a production deployment;
      provision and configure the planned destination according to the installation criteria;
      attempt to install the application in the planned destination;
      determine whether the application installed successfully in the planned destination;
      identify, responsive to the application being unsuccessfully installed, a set of potential scenarios for successfully installing the application;
      evaluate each of the set of potential scenarios to identify an optimal scenario for installing the application; and
      implement the optimal scenario; and
      in response to the application being successfully installed according to the optimal scenario, provision and deploy the application for use as the production deployment on the optimal system based on preferences of an end user.

9. The system of claim 8, the planned destination and the production deployment each comprising a virtual machine infrastructure.

10. The system of claim 8, the memory medium further comprising instructions to identify at least one component of the planned destination that failed during the installation.

11. The system of claim 10, each of the set of potential scenarios comprising a modification of the planned destination based on the at least one component.

12. The system of claim 8, the memory medium further comprising instructions to receive a selection of a test suite for determining whether the application was installed successfully.

13. The system of claim 8, the memory medium further comprising instructions to generate a report identifying the set of potential scenarios.

14. The system of claim 8, the networked computing environment comprising a cloud computing environment.

15. A computer program product for evaluating upgrade scenarios in a networked computing environment, the computer program product comprising a computer readable storage media, and program instructions stored on the computer readable storage media, to:
- receive a selection of an application to be deployed in the networked computing environment, the planned destination being a virtual server that is distinct from a production deployment;
- receive an identification of a planned destination in the networked computing environment for the application, and associated installation criteria;
- provision and configure the planned destination according to the installation criteria;
- attempt to install the application in the planned destination;
- determine whether the application installed successfully in the planned destination;
- identify, responsive to the application being unsuccessfully installed, a set of potential scenarios for successfully installing the application;
- evaluate each of the set of potential scenarios to identify an optimal scenario for installing the application; and
- implement the optimal scenario; and
- in response to the application being successfully installed according to the optimal scenario, provision and deploy the application for use as the production deployment on the optimal system based on preferences of an end user.

16. The computer program product of claim 15, the planned destination and the production deployment each comprising a virtual machine infrastructure.

17. The computer program product of claim 15, the computer readable storage media further comprising instructions to identify at least one component of the planned destination that failed during the installation.

18. The computer program product of claim 17, each of the set of potential scenarios comprising a modification of the planned destination based on the at least one component.

19. The computer program product of claim 15, the computer readable storage media further comprising instructions to receive a selection of a test suite for determining whether the application was installed successfully.

20. The computer program product of claim 15, the computer readable storage media further comprising instructions to generate a report identifying the set of potential scenarios.

21. The computer program product of claim 15, the networked computing environment comprising a cloud computing environment.

22. A method for deploying a system for evaluating upgrade scenarios in a networked computing environment, comprising:
- providing a computer infrastructure to:
  - receive a selection of an application to be deployed in the networked computing environment, the planned destination being a virtual server that is distinct from a production deployment;
  - receive an identification of a planned destination in the networked computing environment for the application, and associated installation criteria;
  - provision and configure the planned destination according to the installation criteria;
  - attempt to install the application in the planned destination;
  - determine whether the application installed successfully in the planned destination;
  - identify, responsive to the application being unsuccessfully installed, a set of potential scenarios for successfully installing the application;
  - evaluate each of the set of potential scenarios to identify an optimal scenario for installing the application; and
- implement the optimal scenario; and
- in response to the application being successfully installed according to the optimal scenario, provision and deploy the application for use as the production deployment on the optimal system based on preferences of an end user.

* * * * *